(12) United States Patent
Nagpal et al.

(10) Patent No.: US 11,900,164 B2
(45) Date of Patent: Feb. 13, 2024

(54) INTELLIGENT QUERY PLANNING FOR METRIC GATEWAY

(71) Applicant: Nutanix, Inc., San Jose, CA (US)

(72) Inventors: Abhinay Nagpal, Fremont, CA (US); Cong Liu, San Jose, CA (US); Himanshu Shukla, San Jose, CA (US); Sourav Kumar, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 569 days.

(21) Appl. No.: 17/172,352

(22) Filed: Feb. 10, 2021

(65) Prior Publication Data

US 2022/0164234 A1    May 26, 2022

Related U.S. Application Data

(60) Provisional application No. 63/117,968, filed on Nov. 24, 2020.

(51) Int. Cl.
*G06F 9/50* (2006.01)
*G06F 16/903* (2019.01)
*G06F 9/455* (2018.01)

(52) U.S. Cl.
CPC ........ *G06F 9/5027* (2013.01); *G06F 9/45558* (2013.01); *G06F 16/90335* (2019.01)

(58) Field of Classification Search
CPC .................................................. G06F 9/5027
See application file for complete search history.

(56) References Cited

U.S. PATENT DOCUMENTS

| 5,802,309 A | 9/1998 | Cook et al. |
| 6,209,128 B1 | 3/2001 | Gerard et al. |
| 6,775,673 B2 | 8/2004 | Mahalingam et al. |

(Continued)

FOREIGN PATENT DOCUMENTS

| CN | 113406169 A | 9/2021 |
| EP | 4 006 737 A1 | 6/2022 |

(Continued)

OTHER PUBLICATIONS

"Choosing a load balancer for your object storage environment", NetApp 2020.

(Continued)

*Primary Examiner* — Charlie Sun
(74) *Attorney, Agent, or Firm* — Foley & Lardner LLP

(57) ABSTRACT

In accordance with some aspects of the present disclosure, an apparatus is disclosed. The apparatus includes a processor and a memory, wherein the memory includes programmed instructions that when executed by the processor, cause the apparatus to receive a request to join a plurality of entity data structures using a first join order, determine a first performance cost of the first join order, determine a second performance cost of a second join order, determine whether the second performance cost is lower than the first performance cost, in response to determining that the second performance cost is lower than or exceeds the first performance cost, select the second join order or the first join order, respectively, join the plurality of entity data structures using the selected join order, and send the joined plurality of entity data structures.

20 Claims, 5 Drawing Sheets

(56) References Cited

U.S. PATENT DOCUMENTS

| | | | |
|---|---|---|---|
| 7,260,563 | B1 * | 8/2007 | Priyadarshi .......... G06F 16/2456 707/999.001 |
| 7,395,279 | B2 | 7/2008 | Iyengar et al. |
| 7,461,912 | B2 | 12/2008 | Kamiyama et al. |
| 7,653,668 | B1 | 1/2010 | Shelat et al. |
| 7,685,109 | B1 | 3/2010 | Ransil et al. |
| 7,721,044 | B1 | 5/2010 | Chatterjee et al. |
| 8,019,732 | B2 | 9/2011 | Paterson-Jones et al. |
| 8,166,128 | B1 | 4/2012 | Faulkner et al. |
| 8,250,033 | B1 | 8/2012 | De Souter et al. |
| 8,311,859 | B2 * | 11/2012 | Patoureaux .......... G06Q 30/02 705/5 |
| 8,312,027 | B2 | 11/2012 | Lamb et al. |
| 8,352,424 | B2 | 1/2013 | Zunger et al. |
| 8,549,518 | B1 | 10/2013 | Aron et al. |
| 8,554,724 | B2 | 10/2013 | Zunger |
| 8,601,473 | B1 | 12/2013 | Aron et al. |
| 8,683,112 | B2 | 3/2014 | Drobychev et al. |
| 8,799,222 | B2 | 8/2014 | Marathe et al. |
| 8,849,759 | B2 | 9/2014 | Bestler et al. |
| 8,850,130 | B1 | 9/2014 | Aron et al. |
| 8,863,124 | B1 | 10/2014 | Aron |
| 8,930,693 | B2 | 1/2015 | Holt et al. |
| 8,997,088 | B2 | 3/2015 | Gurikar et al. |
| 9,003,335 | B2 | 4/2015 | Lee |
| 9,009,106 | B1 | 4/2015 | Aron et al. |
| 9,043,372 | B2 | 5/2015 | Makkar et al. |
| 9,043,567 | B1 | 5/2015 | Modukuri et al. |
| 9,052,942 | B1 | 6/2015 | Barber et al. |
| 9,069,708 | B2 | 6/2015 | Gill et al. |
| 9,069,983 | B1 | 6/2015 | Nijjar |
| 9,110,882 | B2 | 8/2015 | Overell et al. |
| 9,256,498 | B1 | 2/2016 | Leibowitz et al. |
| 9,336,132 | B1 | 5/2016 | Aron et al. |
| 9,342,253 | B1 | 5/2016 | Muthukkaruppan et al. |
| 9,350,623 | B2 | 5/2016 | Shadi et al. |
| 9,405,806 | B2 | 8/2016 | Lysne et al. |
| 9,652,265 | B1 | 5/2017 | Narayanasamy et al. |
| 9,705,970 | B2 | 7/2017 | Pomerantz et al. |
| 9,747,287 | B1 | 8/2017 | Bhardwaj et al. |
| 9,772,866 | B1 | 9/2017 | Aron et al. |
| 9,805,054 | B2 | 10/2017 | Davis et al. |
| 10,003,650 | B2 | 6/2018 | Shetty et al. |
| 10,095,549 | B1 | 10/2018 | Needham et al. |
| 10,120,902 | B2 | 11/2018 | Erdogan et al. |
| 10,152,428 | B1 | 12/2018 | Alshawabkeh et al. |
| 10,176,225 | B2 | 1/2019 | Naidu et al. |
| 10,296,255 | B1 | 5/2019 | Tummala |
| 10,380,078 | B1 | 8/2019 | Kumar et al. |
| 10,409,837 | B1 | 9/2019 | Schmidt et al. |
| 10,528,262 | B1 | 1/2020 | Shmuylovich et al. |
| 10,565,230 | B2 | 2/2020 | Zheng et al. |
| 10,592,495 | B1 | 3/2020 | Shami et al. |
| 10,659,520 | B1 | 5/2020 | Sethuramalingam et al. |
| 10,691,464 | B1 | 6/2020 | Drego et al. |
| 10,725,826 | B1 | 7/2020 | Sagar et al. |
| 10,740,302 | B2 | 8/2020 | Slik et al. |
| 10,747,752 | B2 | 8/2020 | Krishnaswamy et al. |
| 10,802,975 | B2 | 10/2020 | Gottin et al. |
| 10,915,497 | B1 | 2/2021 | Bono et al. |
| 11,086,545 | B1 | 8/2021 | Dayal et al. |
| 11,099,938 | B2 | 8/2021 | Desai et al. |
| 2001/0034733 | A1 | 10/2001 | Prompt et al. |
| 2002/0065776 | A1 | 5/2002 | Calder et al. |
| 2002/0078065 | A1 | 6/2002 | Agulhon |
| 2003/0023587 | A1 | 1/2003 | Dennis et al. |
| 2003/0145310 | A1 | 7/2003 | Thames et al. |
| 2003/0172094 | A1 | 9/2003 | Lauria et al. |
| 2003/0191745 | A1 | 10/2003 | Jiang et al. |
| 2004/0186826 | A1 | 9/2004 | Choi et al. |
| 2005/0273571 | A1 | 12/2005 | Lyon et al. |
| 2006/0041661 | A1 | 2/2006 | Erickson et al. |
| 2006/0047636 | A1 | 3/2006 | Mohania et al. |
| 2006/0080443 | A1 | 4/2006 | Kruglick et al. |
| 2006/0080646 | A1 | 4/2006 | Aman |
| 2006/0161704 | A1 | 7/2006 | Nystad et al. |
| 2007/0088744 | A1 | 4/2007 | Webber et al. |
| 2008/0034307 | A1 | 2/2008 | Cisler et al. |
| 2009/0171697 | A1 | 7/2009 | Glauser et al. |
| 2009/0327621 | A1 | 12/2009 | Kliot et al. |
| 2010/0042673 | A1 | 2/2010 | Dayley |
| 2010/0050173 | A1 | 2/2010 | Hensbergen |
| 2010/0293174 | A1 | 11/2010 | Bennett et al. |
| 2011/0082962 | A1 | 4/2011 | Horovitz et al. |
| 2011/0137966 | A1 | 6/2011 | Srinivasan et al. |
| 2011/0185355 | A1 | 7/2011 | Chawla et al. |
| 2011/0213884 | A1 | 9/2011 | Ferris et al. |
| 2011/0258297 | A1 | 10/2011 | Nightingale et al. |
| 2012/0096052 | A1 | 4/2012 | Tolia et al. |
| 2012/0096205 | A1 | 4/2012 | Velayudhan et al. |
| 2012/0210095 | A1 | 8/2012 | Nellans et al. |
| 2012/0293886 | A1 | 11/2012 | Abe et al. |
| 2012/0331065 | A1 | 12/2012 | Aho et al. |
| 2012/0331243 | A1 | 12/2012 | Aho et al. |
| 2013/0054523 | A1 | 2/2013 | Anglin et al. |
| 2013/0103884 | A1 | 4/2013 | Cho |
| 2013/0198472 | A1 | 8/2013 | Fang et al. |
| 2013/0246431 | A1 | 9/2013 | Ahuja et al. |
| 2013/0332608 | A1 | 12/2013 | Shiga et al. |
| 2014/0095459 | A1 | 4/2014 | Eshel et al. |
| 2014/0279838 | A1 | 9/2014 | Tsirogiannis et al. |
| 2014/0282626 | A1 | 9/2014 | Muguda |
| 2014/0339117 | A1 | 11/2014 | Quan et al. |
| 2014/0379840 | A1 | 12/2014 | Dao |
| 2015/0012571 | A1 | 1/2015 | Powell et al. |
| 2015/0046586 | A1 | 2/2015 | Zhang et al. |
| 2015/0046600 | A1 | 2/2015 | Kim |
| 2015/0079966 | A1 | 3/2015 | Govindarajeswaran et al. |
| 2015/0208985 | A1 | 7/2015 | Huang |
| 2015/0254325 | A1 | 9/2015 | Stringham |
| 2015/0378767 | A1 | 12/2015 | Tarasuk-Levin et al. |
| 2016/0048408 | A1 | 2/2016 | Madhu et al. |
| 2016/0092326 | A1 | 3/2016 | Wu et al. |
| 2016/0117226 | A1 | 4/2016 | Hetrick et al. |
| 2016/0162547 | A1 | 6/2016 | Morris |
| 2016/0188407 | A1 | 6/2016 | Bronnikov et al. |
| 2016/0207673 | A1 | 7/2016 | Shlonsky et al. |
| 2016/0275125 | A1 | 9/2016 | Drobychev et al. |
| 2016/0306643 | A1 | 10/2016 | Klee et al. |
| 2017/0075909 | A1 | 3/2017 | Goodson et al. |
| 2017/0091235 | A1 | 3/2017 | Yammine et al. |
| 2017/0109421 | A1 | 4/2017 | Stearn et al. |
| 2017/0235764 | A1 | 8/2017 | Sharpe et al. |
| 2017/0235818 | A1 | 8/2017 | Gorski et al. |
| 2017/0242746 | A1 | 8/2017 | King et al. |
| 2017/0344575 | A1 | 11/2017 | Naylor et al. |
| 2017/0351450 | A1 | 12/2017 | Brandl et al. |
| 2018/0165161 | A1 | 6/2018 | Slater et al. |
| 2018/0205791 | A1 | 7/2018 | Frank et al. |
| 2018/0292999 | A1 | 10/2018 | Nadkarni |
| 2018/0349463 | A1 | 12/2018 | Bernhardy et al. |
| 2019/0004863 | A1 | 1/2019 | Mainali et al. |
| 2019/0050296 | A1 | 2/2019 | Luo et al. |
| 2019/0102256 | A1 | 4/2019 | Murphy |
| 2019/0196885 | A1 | 6/2019 | Song et al. |
| 2019/0207929 | A1 | 7/2019 | Koorapati et al. |
| 2019/0213175 | A1 | 7/2019 | Kong et al. |
| 2019/0213179 | A1 | 7/2019 | McHugh et al. |
| 2019/0227713 | A1 | 7/2019 | Parthasarathy |
| 2019/0243547 | A1 | 8/2019 | Duggal et al. |
| 2019/0286465 | A1 | 9/2019 | Cui et al. |
| 2019/0324874 | A1 | 10/2019 | Gill et al. |
| 2019/0354544 | A1 | 11/2019 | Hertz et al. |
| 2019/0370043 | A1 | 12/2019 | Olderdissen |
| 2019/0370362 | A1 | 12/2019 | Mainali et al. |
| 2019/0384678 | A1 | 12/2019 | Samprathi et al. |
| 2019/0391843 | A1 | 12/2019 | Franciosi et al. |
| 2020/0004570 | A1 | 1/2020 | Glade et al. |
| 2020/0036787 | A1 | 1/2020 | Gupta et al. |
| 2020/0042364 | A1 | 2/2020 | Kumar Shimoga Manjunatha et al. |
| 2020/0104222 | A1 | 4/2020 | Ramamoorthi et al. |
| 2020/0117637 | A1 | 4/2020 | Roy et al. |
| 2020/0195743 | A1 | 6/2020 | Jiang et al. |

(56) References Cited

U.S. PATENT DOCUMENTS

| | | | |
|---|---|---|---|
| 2020/0201724 A1 | 6/2020 | Saito et al. |
| 2020/0250044 A1 | 8/2020 | Sharma et al. |
| 2020/0310859 A1 | 10/2020 | Gupta et al. |
| 2020/0310980 A1 | 10/2020 | Gupta et al. |
| 2020/0311116 A1 | 10/2020 | Anvaripour et al. |
| 2020/0314174 A1 | 10/2020 | Dailianas et al. |
| 2020/0319909 A1 | 10/2020 | Jawahar et al. |
| 2020/0387510 A1 | 12/2020 | Ransil et al. |
| 2020/0394078 A1 | 12/2020 | Taneja et al. |
| 2021/0026661 A1 | 1/2021 | Sulcer et al. |
| 2021/0034350 A1 | 2/2021 | Chen et al. |
| 2021/0064585 A1 | 3/2021 | Chen |
| 2021/0072917 A1 | 3/2021 | Surla et al. |
| 2021/0124651 A1 | 4/2021 | Srinivasan et al. |
| 2021/0181962 A1 | 6/2021 | Dai et al. |
| 2021/0294499 A1 | 9/2021 | Wang et al. |
| 2021/0406224 A1 | 12/2021 | Neufeld et al. |

FOREIGN PATENT DOCUMENTS

| | | |
|---|---|---|
| WO | WO-2020/146043 A1 | 7/2020 |
| WO | WO-2021/119546 A1 | 6/2021 |
| WO | WO-2021/232109 A1 | 11/2021 |

OTHER PUBLICATIONS

"NetApp StorageGRID", NetApp 2022.

"Tutorial: Transferring data from on-premises storage to Amazon S3 in a different AWS account", https://docs.aws.amazon.com/datasync/latest/userguide/s3-cross-account-transfer.html, accessed Dec. 12, 2022.

"What is AWS Data Sync?", https://docs.aws.amazon.com/datasync/latest/userguide/what-is-datasync.html, accessed Dec. 12, 2022.

Amazon, "Copy your data between on premises object storage and AWS using AWS DataSync", Jul. 27, 2020, https://aws.amazon.com/about-aws/whats-new/2020/07/copy-your-data-between-on-premises-object-storage-and-aws-using-aws-datasync/.

Cloudian, "HyperBalance Load Balancer", https://cloudian.com/products/hyperbalance/, accessed Dec. 12, 2022.

Cloudian, "On-Premises Object Storage: Building S3 in Your Backyard", https://cloudian.com/guides/hybrid-it/on-premises-object-storage/, accessed Dec. 12, 2022.

Cloudian, "S3 Backup: The Complete Guide", https://cloudian.com/blog/s3-backup-the-complete-guide/, accessed Dec. 12, 2022.

Cloudian, "Simple, Secure, Scalable. S3-Compatible, Cloud Native Data Management", https://cloudian.com/products/hyperstore/, accessed Dec. 12, 2022.

NetApp, "StorageGRID: Smart, fast, future-proof object storage", https://www.netapp.com/data-storage/storagegrid/, accessed Dec. 12, 2022.

Final Office Action on U.S. Appl. No. 17/358,967 dated Feb. 22, 2023.

Pritchard, Stephen, "Object Storage: On Prem, in the cloud and hybrid," (Sep. 27, 2018), https://www.computerweekly.com/news/252449283/Object-storage-On-prem-in-the-cloud-and-hybrid, pp. 1-8.

OpenStack. Openstack Object Storage API V1 Reference—API V1.<https://docs.huinoo.com/openstack/archive/api/openstack-object-storage/1.0/os-objectstorage-devguide-1.0.pdf>.2014. (Year: 2014).

Rivkind, Yael. Object Storage: Everything You Need to Know. <https://lakefs.io/blog/object-storage/>Nov. 25, 2020. (Year: 2020).

Cano, Ignacio, et al. "Curator: Self-Managing Storage for Enterprise Clusters" (Mar. 27, 2017), from https://www.usenix.org/conference/nsdi17/.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

"Adding Objects to Versioning—Enabled Buckets", from https://docs.aws.amazon.com/AmazonS3/latest/dev/AddingObjectstoVersioningEnabledBuckets.html, (Oct. 2, 2019).

"Adding objects to versioning-enabled buckets—Amazon Simple Storage Service.pdf," https://docs.aws.amazon.com/AmazonS3/latest/userguide/AddingObjectstoVersioningEnabledBuckets.html, pp. 1-2.

"AWS Pricing"; Amazon Web Services; https://aws.amazon.com/pricing/; Webpage accessed on Jun, 23, 2021; pp. 1-9.

"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.

"Configure a Pod to Use a ConfigMap", from https://kubernetes.io/docs/tasks/configure-pod-container/configure-pod-configmap/, (Oct. 2, 2019).

"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.

"Deployments", from https://kubernetes.io/docs/concepts/workloads/controllers/deployment/,(Oct. 2, 2019).

"How to use Indexing to Improve Database Queries," https://dataschool.com/sql-optimization/how-indexing-works/, pp. 1-12.

"IT Service Provider Technology Solutions and Services"; HPE—Hewlett Packard; https://www.hpe.com/us/en/solutions/service-providers.html?parentPage=/us/en/solutions/service-providers; Webpage accessed on Jun. 23, 2021; pp. 1-6.

"Managed VMware Cloud Services"; VMware; https://cloud.vmware.com/providers/managed-services-provider; Webpage accessed on Jun. 23, 2021; pp. 1-5.

"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.

"Method:disks.get|Compute Engine Documentation|Google Cloud.pdf," https://cloud.google.com/compute/docs/reference/rest/v1/disks/get, pp. 1-17.

"NetApp ONTAP 9.7 Announced—StorageReview.com," (Jun. 14, 2019), https://www.peakresources.com/netapp-ontap-9-6-release-notes-and-thoughts/, pp. 1-5.

"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K60; 2020; pp. 1-3.

"Per Virtual Machine Licensing"; VMware Per VM Pricing & Licensing Help; https://www.vmware.com/support/support-resources/licensing/per-vm.html; Webpage accessed on Jun. 23, 2021; pp. 1-7.

"PUT Object|Cloud Storage|Google Cloud," https://cloud.google.com/storage/docs/XML-api/put-object, pp. 1-3.

"Retrieving object versions from a versioning-enabled bucket—Amazon Simple Storage Service.pdf," https://docs.aws.amazon.com/AmazonS3/latest/userguide/RetrievingObjectVersions.html, pp. 1-3.

"Retrieving Object Versions", from https://docs.aws.amazon.com/AmazonS3/latest/dev/RetrievingObjectVersions.html, (Oct. 2, 2019).

"Set up Cluster Federation with Kubefed—Kubernetes", from https://v1-14.docs.kubernetes.io/docs/tasks/federation/set-up-cluster-federation-kubefed/, (Apr. 17, 2020).

"Storage Tiering"; VMware Docs; https://docs.vmware.com/en/VMware-Validated-Design/5.0/com.vmware.vvd.sddc-design.doc/GUID-20D2BC02-4500-462F-A353-F9B613CC07AC.html; webpage accessed on Jun. 18, 2021; pp. 1-3.

(56) References Cited

OTHER PUBLICATIONS

"SwiftOnFile"; Object Storage-Gluster Docs; v: release3.7.0beta1; https://staged-gluster-docs.readthedocs.io/en/release3.7.0beta1/Administrator%20Guide/Object%20Storage/; webpage accessed on Oct. 28, 2020; pp. 1-2.
"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.
"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.
"Volumes", from https://kubernetes.io/docs/concepts/storage/volumes/, (Oct. 2, 2019).
"Xml and More: OCI?Knowing Object Storage Basics" (Jan. 13, 2019), http://xmlandmore.blogspot.com/2019/01/ociknowing-object-storage-basics.html, pp. 1-6.
Amazon Simple Storage Service User Guide API Version Mar. 1, 2006 (Year: 2006).
B Tree Indexes. http://web.csulb.edu/-amonge/classes/common/db/B TreeIndexes.html, Aug. 4, 2018, pp. 1-7 (2018).
Ballard, Brit, "Back to Basics: Writing SQL Queries," (Apr. 21, 2014), https://thoughtbot.com/blog/back-to-basics-sql, 1-17 pages.
Dellemc, "Elastic Cloud Storage (ECS)," (Aug. 2017), https://repository.usc.edu/sites/repository.usc.edu/files/ecs_overview.pdf. pp. 1-57.
Dubinsky Leon, "Behind the scenes of Cloud Spanner's ExecuteQuery request|Google Cloud Blog," (Jan. 7, 2021), https://cloud.google.com/blog/topics/developers-practitioners/behind-the-scenes-of-cloud-spanners-executequery-request, pp. 1-7.
F5, "Enable Single Namespace for VMware Horizon with View Deployments," https://www.f5.com/pdf/solution-center/vmware-single-namespace-overview.pdf, pp. 1-2.
FireEye, "Building Scalable and Responsive Big Data Interfaces with AWS Lambda | AWS Big Data Blog," (Jul. 10, 2015), https://aws.amazon.com/blogs/big-data/building-scalable-and-responsive-big-data-interfaces-with-aws-lambda/, pp. 1-10.
Gowri Balasubramanian; "Should Your DynamoDB Table be Normalized or Denormalized?"; AWS Database Blog; https://aws.amazon.com/blogs/database/should-your-dynamodb-table-be-normalized-or-denormalized/; Dec.-May 2016; pp. 1-5.
Guess A.R., "Cloudian HyperStore 7 Multi-Cloud Data Management Unifies Public Cloud and On-Premises Storage—Dataversity," (Jan. 29, 2018), https://www.dataversity.net/cloudian-hyperstore-7-multi-cloud-data-management-unifies-public-cloud-premises-storage/, pp. 1-4.
Luis Ayuso; "How to Report Monthly Usage with the Flex Pricing Model"; VMware Cloud Provider Blog; May 20, 2019; pp. 1-6.
Luis Ayuso; "How to Sign Up for the new VCPP Flex Pricing Model"; VMware Cloud Provider Blog; May 20, 2019; pp. 1-6.
Luis Ayuso; "New VCPP Pricing Model Simplifies Delivering Services"; VMware Cloud Provider Blog; May 20, 2019; pp. 1-6.
Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.
Mike Deck; "Building and Maintaining an Amazon S3 Metadata Index without Servers"; AWS Big Data Blog; https://aws.amazon.com/blogs/big-data/building-and-maintaining-an-amazon-s3-metadata-index-without-servers/; Aug.-Dec. 2015; pp. 1-6.
NetApp, "A Unified Platform for Cloud Storage Infrastructure," (Oct. 26, 2020), https://cloud.netapp.com/blog/cvo-blg-one-unified-platform-for-cloud-storage-infrastructure-and-data-services, pp. 1-8.
NetApp, "StorageGRID Solves Your Unstructured Data Management Problems |NetApp Blog," (Apr. 17, 2019), https://www.netapp.com/blog/storagegrid-solves-your-unstructured-data-management-problems/, pp. 1-6.
Oracle Multimedia User's Guide, 12c Release 1 (12.1), E17697-09, Jul. 2014 (Year 2014).
Oracle SQL Developer User's Guide, Release 1.5, E12152-08, Jul. 2014 (Year: 2014); pp. 1-128.
Patel Kiran, Goynes Eddie, "Lower latency with AWS Elemental MediaStore chunked object transfer|AWS Media Blog," (Jul. 2, 2019), https://aws.amazon.com/blogs/media/lower-latency-with-aws-elemental-mediastore-chunked-object-transfer/, pp. 1-6.
Rupprecht Lukas, Zhangz Rui, Owen Bill, Pietzuch Peter, Hildebrandz Dean, "SwiftAnalytics: Optimizing Object Storage for Big Data Analytics," https://lsds.doc.ic.ac.uk/sites/default/files/swift-analytics_ic2e17_crv.pdf, pp. 1-7.
Sonobuoy, "Sonobuoy," https://sonobuoy.io/, 1-6 pages.
Stopford. Log Structured Merge Trees. http://www.benstopford.com/2015/02/14/log-structured-merge-trees, 2015, pp. 1-8 (2015).
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
VM ware, "VMware Cloud Director Object Storage Extension Documentation.pdf," https://docs.vmware.com/en/VMware-Cloud-Director-Object-Storage-Extension/index.html, pp. 1-3.
VMware, "Introducing HCX Enterprise—Cloud Blog—VMware," (Aug. 8, 2019), https://blogs.vmware.com/cloud/2019/08/08/introducing-hcx-enterprise/, pp. 1-6.
VmWare, "VMware HCX Enterprise: Non-vSphere to vSphere Workload Migration—Cloud Blog—VMware," (Aug. 8, 2019), https://blogs.vmware.com/cloud/2019/08/08/vmware-hcx-enterprise-non-vsphere-vsphere-workload-migration/, pp. 1-7.
VMware, "VMware Object Storage Interoperability Service-Development Guide," (Sep. 2021), https://www.vmware.com/content/dam/digitalmarketing/vmware/en/pdf/docs/vmware-object-storage-interoperability-service-development-guide.pdf, pp. 1-19.
Wambler, Choosing a Primary Key: Natural or Surrogate? http://www.agiledata.org/essays/keys.html, 2018, pp. 1-4 (2018).
Wikipedia, "Chunked transfer encoding," https://en.wikipedia.org/wiki/Chunked_transter_encoding, pp. 1-4/.
Woodward Liz, "What Is Elastic Cloud Storage—A Guide to ECS in 2022," https://www.cloudwards.net/what-is-elastic-cloud-storage/, pp. 1-8. Sep. 8, 2023.
Sonobuoy Overview, https://sonobuoy.io/docs/v0.56.10/.
Non-Final Office Action on U.S. Appl. No. 17/358,967 dated Sep. 1, 2023.

* cited by examiner

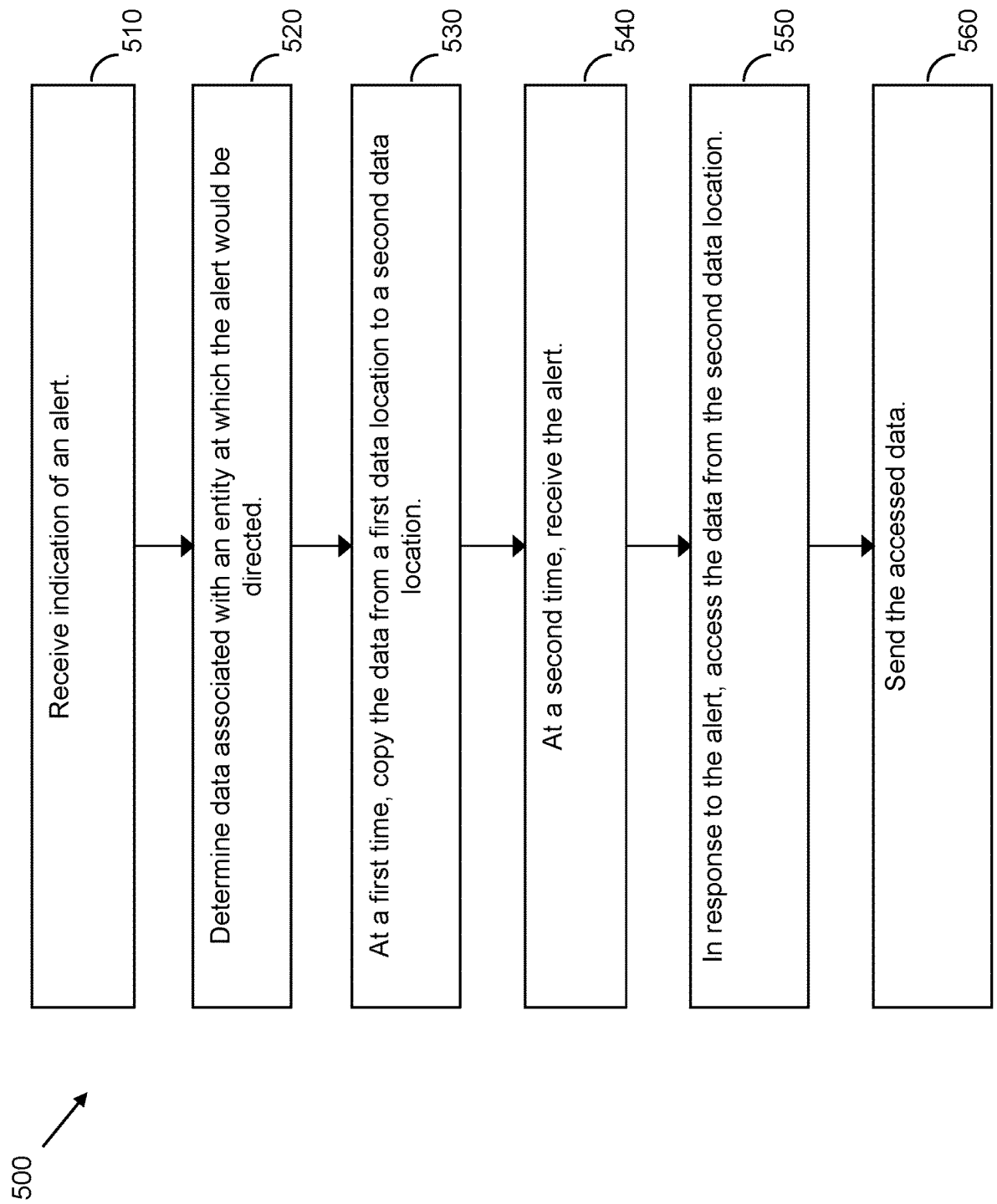

INTELLIGENT QUERY PLANNING FOR METRIC GATEWAY

CROSS-REFERENCE TO RELATED APPLICATION

This application is related to and claims priority under 35 U.S. § 119(e) the U.S. Provisional Patent Application No. 63/117,968, filed Nov. 24, 2020, titled "INTELLIGENT QUERY PLANNING FOR METRIC GATEWAY," the entire contents of which are incorporated herein by reference for all purposes.

BACKGROUND

The following description is provided to assist the understanding of the reader.

Virtual computing systems are widely used in a variety of applications. Virtual computing systems include one or more host machines running one or more entities (e.g., workloads, virtual machines, containers, and other entities) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

In accordance with some aspects of the present disclosure, an apparatus is disclosed. The apparatus includes a processor and a memory, wherein the memory includes programmed instructions that when executed by the processor, cause the apparatus to receive a request to join a first entity data structure, a second entity data structure, and a third entity data structure using a first join order, determine a first performance cost of the first join order, determine a second performance cost of a second join order, and determine whether the second performance cost is lower than the first performance cost. The apparatus includes a processor and a memory, wherein the memory includes programmed instructions that when executed by the processor, cause the apparatus to, in response to determining that the second performance cost is lower than or exceeds the first performance cost, select the second join order or the first join order, respectively. The apparatus includes a processor and a memory, wherein the memory includes programmed instructions that when executed by the processor, cause the apparatus to join the first entity data structure, the second entity data structure, and the third entity data structure using the selected join order to generate a joined entity data structure and send the joined entity data structure.

In accordance with some aspects of the present disclosure, a non-transitory computer readable storage medium is disclosed. The non-transitory computer readable storage medium includes instructions stored thereon that, when executed by a processor, cause the processor to receive a request to join a first entity data structure, a second entity data structure, and a third entity data structure using a first join order, determine a first performance cost of the first join order, determine a second performance cost of a second join order, and determine whether the second performance cost is lower than the first performance cost. The non-transitory computer readable storage medium includes instructions stored thereon, when executed by a processor, cause the processor to, in response to determining that the second performance cost is lower than or exceeds the first performance cost, select the second join order or the first join order, respectively. The non-transitory computer readable storage medium includes instructions stored thereon, when executed by a processor, cause the processor to, join the first entity data structure, the second entity data structure, and the third entity data structure using the selected join order to generate a joined entity data structure and send the joined entity data structure.

In accordance with some aspects of the present disclosure, a computer-implemented method is disclosed. The computer-implemented method includes receiving a request to join a first entity data structure, a second entity data structure, and a third entity data structure using a first join order, determining a first performance cost of the first join order, determining a second performance cost of a second join order, and determining whether the second performance cost is lower than the first performance cost. The computer-implemented method includes, in response to determining that the second performance cost is lower than or exceeds the first performance cost, selecting the second join order or the first join order, respectively. The computer-implemented method includes joining the first entity data structure, the second entity data structure, and the third entity data structure using the selected join order to generate a joined entity data structure and sending the joined entity data structure.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 5 is an example flowchart of a method, in accordance with some embodiments of the present disclosure.

Figure 1:
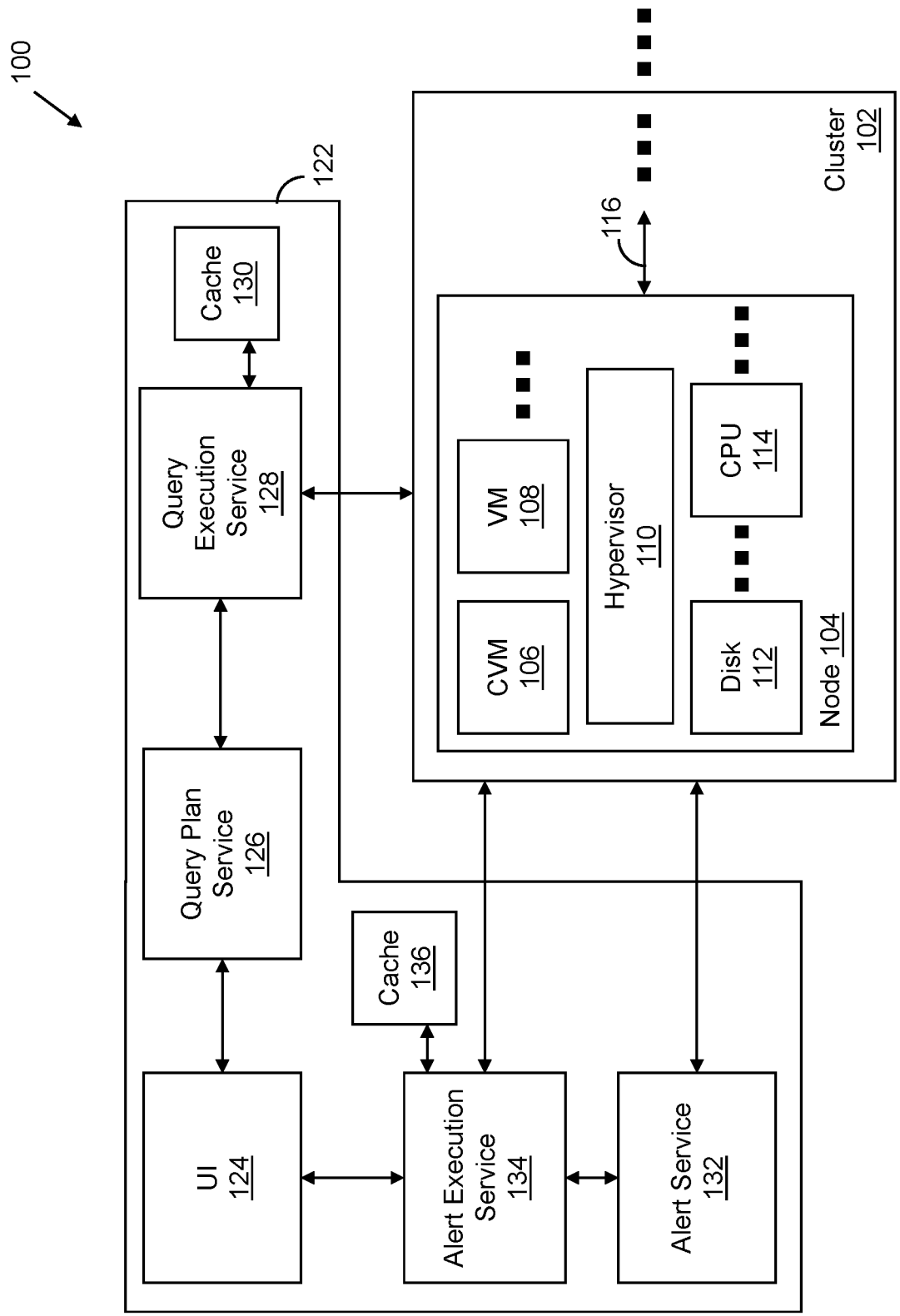
FIG. 1 is an example block diagram of a virtual computing system for signal planning and executing, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Some implementations of cluster management services enable a user to query, view, filter, sort, group, and extract information from data center entities. One problem is that certain entities, or hosts/disks/etc. of entities, suffer intermittent contention or other performance-related issues. Additionally, one or more types of entity tables may vary in size from one or more other types of entity tables. When a user sends a query for entity information, such as a join query, the manner and/or order in which the entity information is collected can cause degraded performance such as increased latency, reduced throughput, and/or an increased in network hops, thereby worsening user experience.

Described herein are embodiments of a query plan service that detects a contention, a join order that sub-optimally filters entities, or other issue and reorders operations of the query in order to minimize or eliminate the effect of the contention, suboptimal filtering, or other issue. For example, the query plan service can reorder the joins so that entity tables of the least contentious entities are joined first. Such a reorder increases the likelihood that the more contentious entities will resolve their own contentions before their data is joined to the other entities' data. Additionally or alternatively, the query plan service can reorder the joins so that smallest entity tables are joined first. Such a reorder increases a number of entities that are filtered out before they are joined. This is advantageous for resource-expensive joins such as category joins for category and/or cluster-based access control. Accordingly, reordering operations of the query is beneficial to reduce latency, reduce resource usage, and improve user experience.

Another problem is that certain queries are expensive in terms of CPU, I/O, or network usage. Especially with distributed data centers holding Terabytes of data, poor execution of the queries can result in unnecessary latency and usage.

Described herein are embodiments of a query executing service that detects performance bottlenecks such as queries that causes excessive CPU, I/O, or network usage. In some embodiments, the query executing service requests or accepts user hints on data preference or tolerance. For example, the user may only accept strongly consistent data, or the user may tolerate eventually consistent data. In some embodiments, the query executing service caches data up front when there is a bottleneck and the user tolerates slightly stale data. Advantageously, embodiments of the systems and methods described herein provides flexibility to the user and tailors performance tradeoffs based on the use case. Moreover, in cases where the user tolerates less consistent data, embodiments of the systems and methods described herein reduce latency.

Another problem is that certain alerts are expensive in terms of CPU, I/O, or network usage. In particular, users cannot afford delays on addressing issues flagged by alerts because if the alert is not addressed in a timely manner, a disk, node, or cluster may fail causing a disruption to an entire team or department of an organization.

Described herein are embodiments of an alert executing service that determines the entities related to an alert. In some embodiments, the alert executing service proactively caches the data for the related entities so that when the user requests the data in order to troubleshoot the issue raised by the alert, the data will be delivered promptly to the user, thereby improving user experience and reducing the likelihood of a massive failure event.

FIG. 1 is an example block diagram of a virtual computing system 100 for signal planning and executing, in accordance with some embodiments of the present disclosure. The virtual computing system 100 includes one or more clusters 102 (e.g., hyper-converged infrastructure (HCI) clusters). The one or more clusters 102 are connected by a network 116. The one or more clusters can be located in one data center (on-premises) or one cloud, or distributed across multiple data centers, multiple clouds, or a data center-cloud hybrid. The one or more clusters 102 includes one or more nodes 104 (e.g., host machines, computers, computing devices, physical devices). The one or more nodes 104 include a controller virtual machine (CVM) 106, one or more virtual machines (VMs) 108, a hypervisor 110, one or more disks 112, and one or more central processing units (CPUs) 114. The one or more VMs 108 may run their own operating systems and applications on underlying resources (e.g., the one or more disks 112 and the one or more central processing units (CPUs) 114) virtualized through the hypervisor 110. The CVM 106 controls the I/O operation between the one or more disks 112 on its node 104 and VMs 108 on any node 104 in the one or more clusters 102. The one or more VMs 108 and the CVM 106 share resources of the one or more nodes 104. Thus, operating system (OS) data, application data, VM configuration data, and other data used by the one or more VMs 108 can be distributed across disks 112 on multiple nodes 104.

The virtual computing system 100 includes a cluster management service 122 which lets the user view as well as filter, sort, and group data center entities such as VMs, clusters, nodes, networks, etc. The cluster management service 122 plans and executes signals, which include queries and alerts. A query can include a point query. For example, a user can query a VM state in order to update a VM configuration parameter such as a VM name. A query can include a query for a report or other data for troubleshooting or debugging an issue affecting a cluster. A query can include a join query. A query can include one or more of a point query, a query for a report, or a join query.

The cluster management service 122 includes a user interface (UI) 124. In response to inputs from users (e.g., customers, datacenter administrators, cloud administrators, database administrators, system reliability engineers), the UI 124 receives/generates/displays queries or other requests from users. In some embodiments, each cluster 102 is dedicated to one department (e.g., human resources, finance, database, infrastructure technology) of an organizational client and each cluster 102 has a corresponding UI 124 that receives queries or other requests from a corresponding user. In response to inputs from a processor (e.g., query plan service 126, query execution service), the UI 124 provides/displays/renders responses to queries to the user.

The cluster management service 122 includes a query plan service 126 coupled to the UI 124. The UI 124 may forward the queries to the query plan service 126. The query plan service 126 optimizes for modeling relational queries over entity graphs. The query plan service 126 translates the query into a graph query (e.g., an entity graph). An entity graph is a graph that models relationships between entities. For example, the query plan service 126 translates a join query into an entity graph that models an order in which entity data structures that are to be joined.

Figure 2:
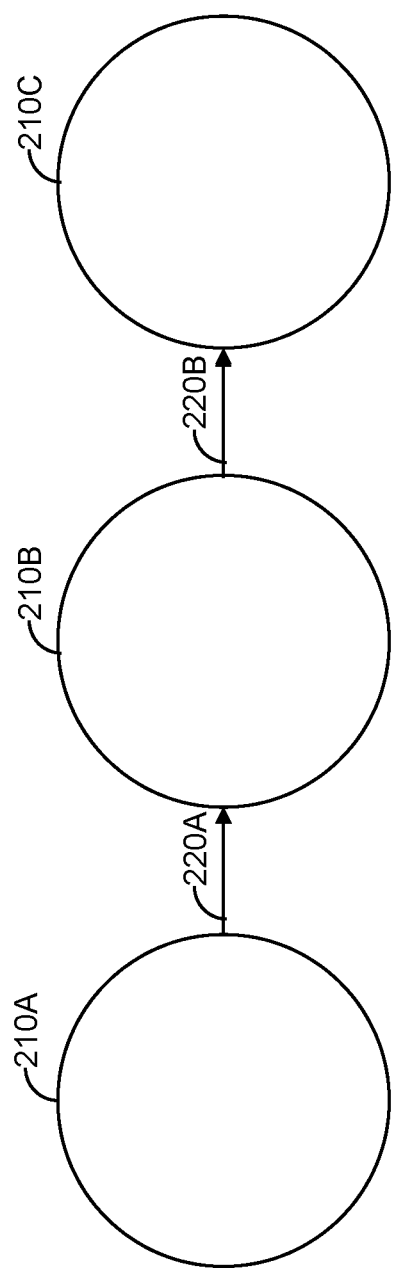
FIG. 2 is an example entity graph is shown, in accordance with some embodiments of the present disclosure.

Referring now to FIG. 2, an example entity graph 200 is shown, in accordance with some embodiments of the present disclosure. The entity graph 200 includes a plurality of vertices 210 and one or more edges 220. Each of the vertices 210 indicates/models a data structure (e.g., an entity table) of one or more entities, in which each entity data structure can have a number of entries equal to the number of entities for that entity data structure. For example, vertex 210A indicates a first entity data structure of one or more virtual machines, vertex 210B indicates one or more keys, and vertex 210C indicates one or more values. Keys and values (and key-value pairs) are categories. In some embodiments, a category is a user-defined entity. For example, the keys in vertex 210B can be controller virtual machines and the values in vertex 210C can be clusters. A category can include one or more of key-value pairs, keys, values, virtual machines, hosts, disks, clusters, etc.

Each of the edges 220 indicates a link between the entities. The edge 220 may indicate a join order. For example, an edge 220A pointing from 210A towards 210B indicates that the entity data structure of 210B is to be joined to the entity data structure of 210A. Likewise, an edge 220B pointing from 210B towards 210C indicates that the entity data structure of 210C is to be joined to the entity data structure of 210B (after 210B is joined to the entity data structure of 210A). In the example, the two joins generate a new (e.g., combined) entity data structure.

As part of a join, an entry from a first data structure is joined/merged/combined with an entry in a second data structure if the two entries have one matching value for a specified column/attribute. For example, a certain entry in a VM table is joined with a certain entry in a cluster table if a column in each table for disk_ID has a same value. In some types of joins (e.g., inner join, left join, right join), an entry from a first data structure may not be included in the joined data structure if the second data structure does not have an entry with a matching value for the specified column or attribute. This aspect is referred to as filtering.

The query plan service 126 supports category and cluster-based access control over the entity graph in a distributed hyper-converged data center (such as the one or more clusters 102). Customers can put entities in categories and define access control policy based on categories. Thus, a category join (e.g., due to security role-based access control (RBAC)) is leveraged. Accordingly, entities can be represented as a power law distribution in terms of a number of accesses to categories as well as the entities within them (e.g., a number of edge out degrees of an entity). As used herein, a power law distribution is a distribution in which most (e.g., 95%) of the items are clustered in one part of the distribution (e.g., the high end or low end) and the remaining items form a long tail of the distribution. For example, certain entities that have a high (e.g., higher than a predetermined threshold) edge out degree (for example, certain kinds of categories that are used in RBAC) may be infrequent but may incur a greater performance degradation than the performance degradation of entities that do not have a high edge out degree.

The query plan service 126 determines (e.g., arranges, re-arranges, generates, modifies) a join order (e.g., an order in which the entity data structures are joined), e.g., as part of a query plan. In some embodiments, the query plan service 126 looks at is the particular graph vertex (e.g., the size of the table indicated by the vertex) involved in the join and, as such, reorders the query plan to filter as many entities as possible early on. In some embodiments, the query plan service 126 traverses the category with the least number of entities to filter early on to avoid larger computation later and to reduce (e.g., total) resource usage/consumption. This is particularly advantageous, for example, when there are many combinations of AND or OR operators between categories. Further, in case of OR clauses in queries (e.g., in the conditions of the queries), in which it is possible to revisit the same edges again, the query plan service 126 reduces the number of backend store calls.

In one example, the vertex 210A indicates an entity data structure having entries for 40 virtual machines, vertex 210B an entity data structure having entries for 20 keys, and vertex 210C an entity data structure having entries for 10 values, the query plan service 126 reorders the query plan to one wherein the entity data structure of vertex 210B is to be joined to the entity data structure of vertex 210C first, then the entity data structure of vertex 210A is to be joined to the joined entity data structure of vertices 210B-C. Based on this plan by the query plan service 126, the query execution service 128, in executing the query plan, filters some of the entities/entries (e.g., 30 of the 40 virtual machines) before joining the entity data structure of vertex 210A. This is more optimal than joining vertex 210A to vertex 210B first, in which only 20 of the 40 virtual machines are filtered before the next join of vertex 210C. Advantageously, filtering more entities earlier results in lower latency and lower resource usage.

In some embodiments, when one of the nodes (e.g., in a distributed network/cloud/data center of nodes) which owns the category entity is running hot (e.g., using a predetermined amount/percentage/portion of available resources, achieving a predetermined amount/percentage/portion of resource capacity, or causing or likely to cause a resource contention) on disk, CPU, memory, or network resources, the query plan service 126 re-orders the traversal such that the virtual computing system 100 queries other nodes until the contention goes away.

The cluster management service 122 includes a query execution service 128 coupled to the query plan service 126. The query execution service 128 receives a query plan from the query plan service 126 and executes the query plan. The query execution service 128 learns the cost/profile of executing queries in terms of CPU, input/output (I/O), and network metrics. The query execution service 128 can prevent head of line blocking for lighter queries depending on current system load.

The query execution service 128 detects bottlenecks/degradations/costs in CPU, I/O, and network performance greater than a predetermined threshold. For example, the query execution service 128 determines a first CPU cost when a query requires greater than a predetermined CPU cycles for data processing/computing. Also, the query execution service 128 determines a first I/O cost when a query requires greater than a predetermined number of reads from a disk (or writes to a disk). Moreover, the query execution service 128 determines a first network cost when more than a predetermined number of network hops are required to fetch data.

The query execution service 128 accepts user hints for certain queries that can work with relaxed guarantees (e.g., in terms of consistency). In some embodiments, the user may indicate that the user only accepts highly consistent data (e.g., data from a location on one or more of the disks 112). For example, when fetching a VM state/configuration, the user may request highly consistent (e.g., fresh/new) data in order to modify the system state. In some embodiments, the user may indicate that the user permits eventually consistent data (e.g., data from a location of the cache 130 coupled to the query execution service 128). For example, when generating a report in order to debug an issue (e.g., which users powered on in the last 7 days), the user may permit slightly stale data by reading from the cache 130. In some embodiments, at a first time, the query execution service 128 or one of the VMs 108 or the CVM 106 copies data from one or more of the disks 112 to the cache 130. In case the current system load crosses a threshold, the query execution service 128 may choose to return a cached result set.

The cluster management service 122 includes an alert service 132 that receives or generates an alert. The alert can predict/report a disk failure or a bully VM (e.g., a VM that consumes resources and causes contention with other VMs for resources).

The cluster management service 122 includes an alert execution service 134 coupled to the UI 124 and coupled to the alert service 132. The alert execution service 134 can receive alerts from the alert service 132 or user-generated alerts from the UI 124. The alert execution service 134 supports prefetching (e.g., proactive/up-front caching). The alert execution service 134 looks at a current system state such as critical alerts and prefetches metric/state information for entities (e.g., VM, host, disk, network card, etc.) affected by the alert. The alert execution service 134 takes the entity relationships into consideration when determining entities affected by the alert. The alert execution service 134 caches data (e.g., configuration settings, web pages) that the alert execution service 134 predicts that the user will use. For example, in response to the alert service 132 and/or machine learning (ML) algorithms forecast a disk is going to fail and/or proactively raise an alert, the alert execution service 134 fetches information for the node containing the disk, VM/container metrics which could get affected by the failure, and the page where the user can order a new disk. At a first time, the predicted data is copied to the cache 136 to avoid a cold start. Then, at a second time, the alert service 132 reads the predicted data from the cache to improve the user experience. Another example is that the alert identifies an I/O bully VM, which can affect any VM on the cluster. The alert service 132 can copy data about all of the VMs of the cluster to avoid a cold start.

Each of the components (e.g., elements, entities) of the virtual computing system 100 (e.g., the cluster management service 122, the UI 124, the query plan service 126, the query execution service 128, the alert service 132, and the alert execution service, 134), is implemented using hardware, software, or a combination of hardware or software, in one or more embodiments. Each of the components of the virtual computing system 100 may be a processor with instructions or an apparatus/device including a processor with instructions, in some embodiments. In some embodiments, multiple components (e.g., the query plan service 126, the query execution service 128, and/or the alert service 132) may be part of a same apparatus and/or processor. Each of the components of the virtual computing system 100 can include any application, program, library, script, task, service, process or any type and form of executable instructions executed by one or more processors, in one or more embodiments. Each of the one or more processors is hardware, in some embodiments. The apparatus may include one or more computer readable and/or executable storage media including non-transitory storage media, or memory. The instructions may be stored on one or more of the storage or memory, and the instructions, when executed by the processor, can cause the apparatus to perform in accordance with the instructions.

Figure 3:
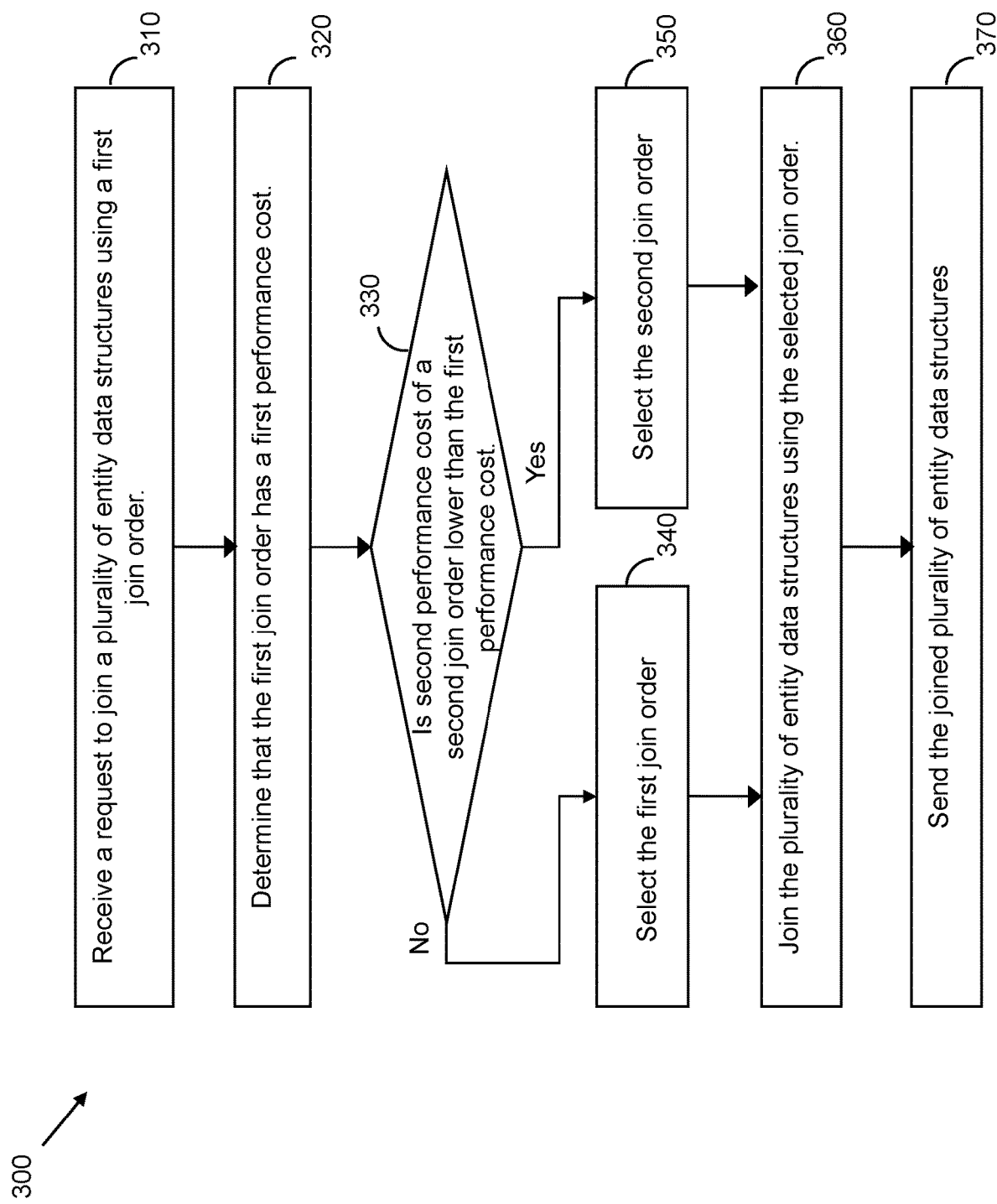
FIG. 3 is an example flowchart of a method, in accordance with some embodiments of the present disclosure.

Referring now to FIG. 3, a flowchart of an example method 300 is illustrated, in accordance with some embodiments of the present disclosure. The method 300 may be implemented using, or performed by, the virtual computing system 100, one or more components of the virtual computing system 100, or a processor associated with the virtual computing system 100 or the one or more components of the virtual computing system 100. Additional, fewer, or different operations may be performed in the method 300 depending on the embodiment.

The processor (e.g., the query plan service 126, the query execution service 128, or a combination thereof) receives a request to join a plurality of entity data structures using (e.g., in accordance with) a first join order having a first performance cost (at operation 310). For example, the processor receives a query that requests to (a) join entity data tables A and B, and then (b) join the combined entity data table A-B with an entity data table C. In some embodiments, the processor receives the request from a user interface (e.g., the UI 124) in response to inputs from a user.

The processor determines that the first join order has a first performance cost (at operation 320). In some embodiments, the first performance cost is a performance metric (e.g., one or more of a queue length, a first central processing unit (CPU) usage, a first input/output (I/O) usage, a first network usage, an I/O throughput, an I/O per second (IOPS), or a latency, e.g., from a sending a request to a node to fetch an entity data structure or join two entity data structures to receiving a response to the request with the requested entity data structure). In some embodiments, the performance metric is of a node that the entity (corresponding to one of the entity data structures that is to be joined first) is operating within or coupled to. For example, the processor determines the CPU usage of a node that a VM listed in entity table A is on. In some embodiments, the first performance cost is compared to a predetermined threshold that indicates contention, e.g., in processing queries. In some embodiments, the performance cost is a statistical performance cost (e.g., a latency value/range and a likelihood of the latency value).

In some embodiments, the first performance cost is a count (e.g., size, number) of entities (e.g., entries) of one of the entity data structures that is to be joined first. In some embodiments, the performance cost is a number of entities (e.g., number of entity data structures) that are to be joined in total. For example, if entity table A includes (e.g., lists, is associated with) X entities, and entity table B and C each include Y entities, in which X>Y, joining A first results in joining X+Y+Y entities and filtering out X-Y entities after. However, joining either B or C first results in joining Y+Y+Y entities because X-Y entities of A can be filtered out before joining A. In some embodiments, the first performance cost is a combination of a performance metric and a count of entities. For example, 50% of the cost is determined by a performance metric, 50% by a count of entities, and one of the costs is scaled to the other.

The processor determines whether a second join order having a second performance cost lower than the first performance cost (at operation 330). For example, the second join order may be joining entity data tables B and C first, and then joining the entity data table B-C and the entity table A. The second performance cost may be based on a performance metric of one or more entities or count of entities in one or more entity data structures, e.g., to be joined first using the second join order.

If the processor determines that the performance cost of the second join order is not lower than (e.g., exceeds) the performance cost of the first join order, the processor selects the first join order (340). If the processor determines that the performance cost of the second join order is lower than the performance cost of the first join order, the processor selects the second join order (350). The processor may determine that the performance cost is lower for the second join order because (a) the contention is likely to be reduced or go away before sending a request to the contentious node, during the time the other entity data structures are being joined, and/or (b) less resources are used because some entities are filtered out before the joins. In the example, the processor determines that the latency of requesting a join from node D using the second join order is less than 1 second, which is less than the latency of the first join order.

The processor joins the plurality of entity data structures using the second join order (at operation 360) using the selected join order. The processor sends the joined plurality of entity data structures (at operation 370). In some embodiments, the processor sends the joined plurality of entity data structures (e.g., joined tables) to the UI. In some embodiments, the joined tables are rendered on the UI. In some embodiments, the joined tables are used to troubleshoot an issue and perform a remediation action. For example, a user or a component of the virtual computing system 100 determines, based on the joined tables, that a disk is failing. In response to inputs from the user, the UI sends a request for a new disk to replace the failing disk. Advantageously, by using the second join order, the performance cost (e.g., a number of entities joined, the latency, and/or the resource usage) is decreased, thereby improving the user experience, e.g., in obtaining the joined tables and in performing the remediation action.

In some embodiments, the first entity data structure includes a first entity (e.g., VM1) and a second entity (e.g., VM2) and wherein the first entity and the second entity are in different geographic locations of a distributed, hyperconverged data center. In some embodiments, the first entity data structure includes a first entity of a first entity type (e.g., VMs), the second entity data structure is a second entity of a second entity type (e.g., clusters), and the third entity data structure is a third entity of a third entity type (e.g., categories).

Figure 4:
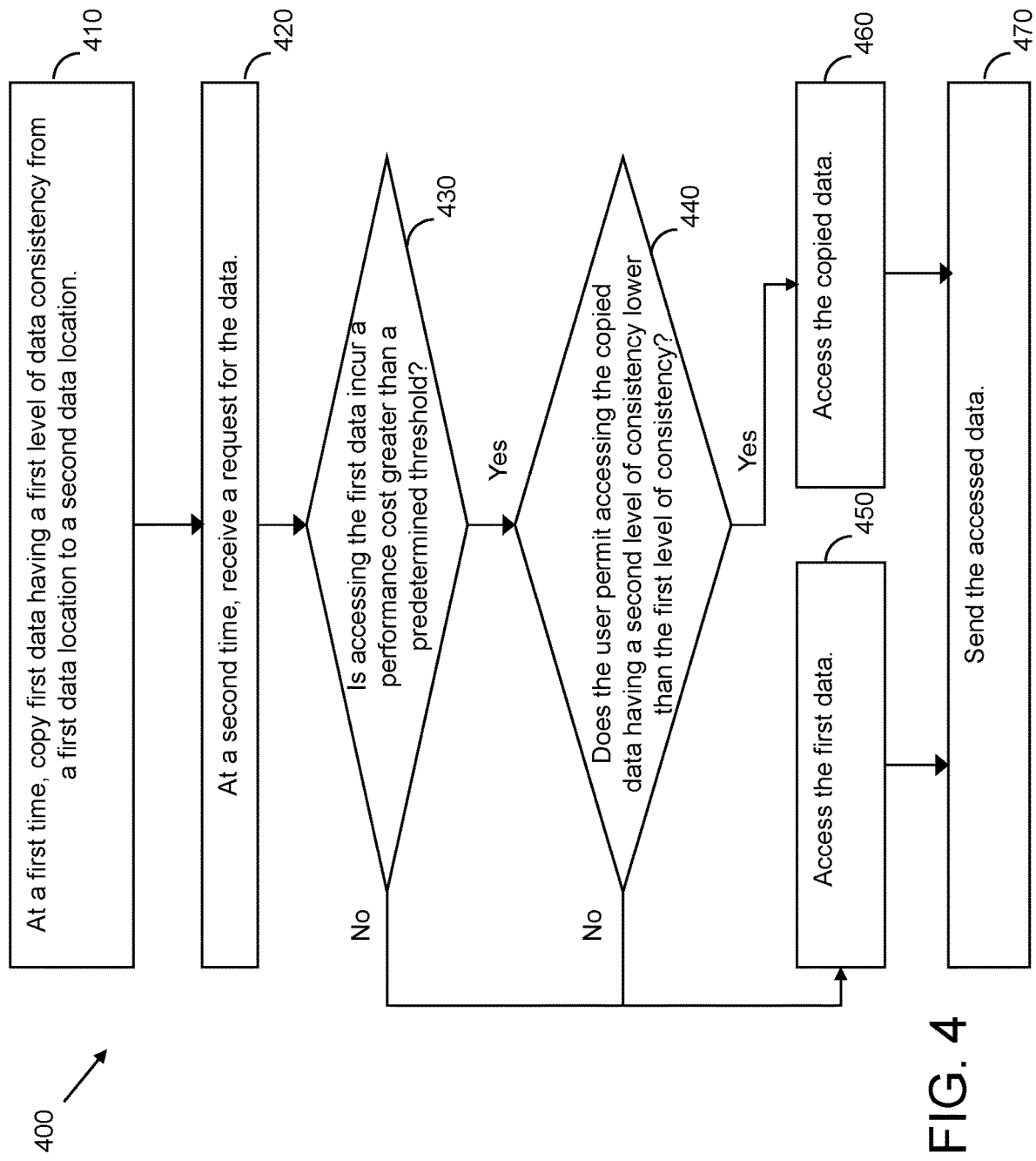
FIG. 4 is an example flowchart of a method, in accordance with some embodiments of the present disclosure.

Referring now to FIG. 4, a flowchart of an example method 400 is illustrated, in accordance with some embodiments of the present disclosure. The method 400 may be implemented using, or performed by, the virtual computing system 100, one or more components of the virtual computing system 100, or a processor associated with the virtual computing system 100 or the one or more components of the virtual computing system 100. Additional, fewer, or different operations may be performed in the method 400 depending on the embodiment. One or more operations of the method 400 may be combined with one or more operations of the method 300.

At a first time, a processor (e.g., the query execution service 128) copies first data having a first level of data consistency (e.g., strongly consistent, higher consistency guarantee) from a first data location (e.g., one of the one or more disks 112) to a second data location (e.g., the cache 130) (at operation 410). In some embodiments, the first level of data consistency is greater than a first consistency threshold. The level of consistency may be described as a probability that the data is new/fresh/the latest/not stale. For example, the probability that the first data is new data is greater than a first threshold. The second data location may have a second level of data consistency (e.g., eventually consistent, lower consistency guarantee). For example, the second level of data consistency is less than a second consistency threshold At a second time, the processor receives a request for the data (at operation 420). The request may be from a UI (the UI 124). The second time is after the first time. The processor determines whether accessing the first data incurs a performance cost greater than a predetermined threshold (at operation 430). For example, the performance cost is a latency or a CPU usage greater than the predetermined threshold. The performance cost being greater than the predetermined threshold may indicate that there is contention at the first data location.

If the processor determines that the performance cost is greater than the predetermined threshold, the processor determines whether a user permits, e.g., instructions, policies, or patterns (e.g., detected by heuristics or machine learning) indicate that a user permits, accessing the copied data (at operation 440). The user is using, or associated with, the UI. The copied data has a second level of data consistency lower than the first level of data consistency. For example, the probability that the copied data is new is lower than the probability that the first data is new. If the processor determines that the user does not permit accessing the copied data, then the processor accesses the first data (at operation 450). If the processor determines that (a) the performance cost is not greater than (e.g., less than) the predetermined threshold or (b) the user permits accessing the copied data, then the processor accesses the copied data (at operation 460). The processor sends the accessed data (at operation 470). The processor may send the data to the UI. Advantageously, by accepting hints from the user, the method 400 adapts to the particular user preference and/or use case. Additionally, by accessing the copied data, the performance cost (e.g., the latency) is decreased, thereby improving the user experience.

Referring now to FIG. 5, a flowchart of an example method 500 is illustrated, in accordance with some embodiments of the present disclosure. The method 500 may be implemented using, or performed by, the virtual computing system 100, one or more components of the virtual computing system 100, or a processor associated with the virtual computing system 100 or the one or more components of the virtual computing system 100. Additional, fewer, or different operations may be performed in the method 500 depending on the embodiment. One or more operations of the method 500 may be combined with one or more operations of one or more of the methods 300 and 400.

The processor (e.g., the alert execution service) receives an indication (e.g., prediction) of an alert (at operation 510), e.g., that a component of a hyper-converged system is failing or is performing sub-optimally. In some embodiments, the processor determines/identifies the indication of the alert based on heuristics or machine learning of data (e.g., historical data). The processor determines data associated with/relevant to an entity to which the alert would be directed (at operation 520). In some embodiments, because the data is associated with/relevant to the entity, there is some probability that a user or component will request to access the data if the alert is raised. At a first time, the processor copies the data from a first data location (e.g., one of the one or more disks 112) to a second data location (e.g., the cache 130) (at operation 530). At a second time, the processor receives the alert or a request for data of the entity (at operation 540). The alert may be from another component of the virtual computing system 100 such as the alert service 132. The request may be from the UI (e.g., the UI 124). In response to the alert or request, the processor may access the data from the second data location (at operation 550). The processor sends the accessed data (at operation 560). The processor may send the data to the UI. Advantageously, by accessing the data from the second data location, the latency is decreased, thereby improving the user experience.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. An apparatus comprising a processor and a memory, wherein the memory includes programmed instructions that when executed by the processor, cause the apparatus to:
   receive a request to join a first entity data structure, a second entity data structure, and a third entity data structure using a first join order;
   determine a first performance cost of the first join order;
   determine a second performance cost of a second join order;
   determine whether the second performance cost is lower than the first performance cost;
   in response to determining that the second performance cost is lower than or exceeds the first performance cost, select the second join order or the first join order, respectively;
   join the first entity data structure, the second entity data structure, and the third entity data structure using the selected join order to generate a joined entity data structure; and
   send the joined entity data structure.

2. The apparatus of claim 1, wherein the first join order indicates that the first entity data structure is to be joined to the second entity data structure to generate a fourth entity data structure, and wherein the third entity data structure is to be joined to the fourth entity data structure and wherein the second join order indicates that the first entity data structure is to be joined to the third entity data structure to generate a fifth entity data structure, and wherein the second entity data structure is to be joined to the fifth entity data structure.

3. The apparatus of claim 1, wherein the first performance cost includes a first count of a first plurality of entities of the second entity data structure and the second performance cost includes a second count of a second plurality of entities of the third entity data structure.

4. The apparatus of claim 1, wherein the first performance cost includes one or more of a first central processing unit (CPU) usage, a first input/output (I/O) usage, or a first network usage of a first node including a first entity of the second entity data structure and the second performance cost includes one or more of central processing unit (CPU) usage, input/output (I/O) usage, or network usage of a second node including a second entity in the third entity data structure.

5. The apparatus of claim 1, wherein the first entity data structure includes a first entity and a second entity and wherein the first entity and the second entity are in different geographic locations of a distributed, hyper-converged data center.

6. The apparatus of claim 1, wherein the first entity data structure is in a first data location with a higher consistency guarantee and a second data location with a lower consistency guarantee, wherein the memory includes programmed instructions that when executed by the processor, cause the apparatus to:
  determine whether accessing the first entity data structure is in the first data location is greater than a first predetermined threshold,
  in response to determining that accessing the first entity data structure is in the first data location is greater than or less than the first predetermined threshold, access the data in the second location or the first location, respectively.

7. The apparatus of claim 1, wherein the first entity data structure is in a first data location with a higher consistency guarantee and a second data location with a lower consistency guarantee, wherein the memory includes programmed instructions that when executed by the processor, cause the apparatus to:
  determine whether first instructions indicate to access the data in the second location,
  in response to determining that the first instructions indicate or do not indicate to access the data in the second location, access the data in the second location or the first location, respectively.

8. The apparatus of claim 1, wherein the memory includes programmed instructions that when executed by the processor, cause the apparatus to:
  copy the first entity data structure from a first data location to a second data location based on an indication that an alert is to occur; and
  in response to the alert occurring, access the entity data structure from the second data location.

9. A non-transitory computer readable storage medium comprising instructions stored thereon that, when executed by a processor, cause the processor to:
  receive a request to join a first entity data structure, a second entity data structure, and a third entity data structure using a first join order;
  determine a first performance cost of the first join order;
  determine a second performance cost of a second join order;
  determine whether the second performance cost is lower than the first performance cost;
  in response to determining that the second performance cost is lower than or exceeds the first performance cost, select the second join order or the first join order, respectively;
  join the first entity data structure, the second entity data structure, and the third entity data structure using the selected join order to generate a joined entity data structure; and
  send the joined entity data structure.

10. The medium of claim 9, wherein the first join order indicates that the first entity data structure is to be joined to the second entity data structure to generate a fourth entity data structure, and wherein the third entity data structure is to be joined to the fourth entity data structure and wherein the second join order indicates that the first entity data structure is to be joined to the third entity data structure to generate a fifth entity data structure, and wherein the second entity data structure is to be joined to the fifth entity data structure.

11. The medium of claim 9, wherein the first performance cost includes a first count of a first plurality of entities of the second entity data structure and the second performance cost includes a second count of a second plurality of entities of the third entity data structure.

12. The medium of claim 9, wherein the first performance cost includes one or more of a first central processing unit (CPU) usage, a first input/output (I/O) usage, or a first network usage of a first node including a first entity of the second entity data structure and the second performance cost includes one or more of central processing unit (CPU) usage, input/output (I/O) usage, or network usage of a second node including a second entity in the third entity data structure.

13. The medium of claim 9, wherein the first entity data structure includes a first entity and a second entity and wherein the first entity and the second entity are in different geographic locations of a distributed, hyper-converged data center.

14. The medium of claim 9, wherein the first entity data structure is in a first data location with a higher consistency guarantee and a second data location with a lower consistency guarantee, wherein the medium further comprises instructions, when executed by the processor, cause the processor to:
  determine whether accessing the first entity data structure is in the first data location is greater than a first predetermined threshold,
  in response to determining that accessing the first entity data structure is in the first data location is greater than or less than the first predetermined threshold, access the data in the second location or the first location, respectively.

15. The medium of claim 9, wherein the first entity data structure is in a first data location with a higher consistency guarantee and a second data location with a lower consistency guarantee, wherein the medium further comprises instructions, when executed by the processor, cause the processor to:
  determine whether first instructions indicate to access the data in the second location,
  in response to determining that the first instructions indicate or do not indicate to access the data in the second location, access the data in the second location or the first location, respectively.

16. The medium of claim 9, further comprising instructions stored thereon that, when executed by a processor, cause the processor to:
  copy the first entity data structure from a first data location to a second data location based on an indication that an alert is to occur; and
  in response to the alert occurring, access the entity data structure from the second data location.

17. A computer-implemented method comprising:
receiving a request to join a first entity data structure, a second entity data structure, and a third entity data structure using a first join order;
determining a first performance cost of the first join order;
determining a second performance cost of a second join order;
determining whether the second performance cost is lower than the first performance cost;
in response to determining that the second performance cost is lower than or exceeds the first performance cost, selecting the second join order or the first join order, respectively;
joining the first entity data structure, the second entity data structure, and the third entity data structure using the selected join order to generate a joined entity data structure; and
sending the joined entity data structure.

18. The method of claim 17, wherein the first join order indicates that the first entity data structure is to be joined to the second entity data structure to generate a fourth entity data structure, and wherein the third entity data structure is to be joined to the fourth entity data structure and wherein the second join order indicates that the first entity data structure is to be joined to the third entity data structure to generate a fifth entity data structure, and wherein the second entity data structure is to be joined to the fifth entity data structure.

19. The method of claim 17, wherein the first performance cost includes a first count of a first plurality of entities of the second entity data structure and the second performance cost includes a second count of a second plurality of entities of the third entity data structure.

20. The method of claim 17, wherein the first performance cost includes one or more of a first central processing unit (CPU) usage, a first input/output (I/O) usage, or a first network usage of a first node including a first entity of the second entity data structure and the second performance cost includes one or more of central processing unit (CPU) usage, input/output (I/O) usage, or network usage of a second node including a second entity in the third entity data structure.

* * * * *